(12) United States Patent
Chambliss et al.

(10) Patent No.: US 7,904,538 B2
(45) Date of Patent: Mar. 8, 2011

(54) SYSTEM AND METHOD FOR MANAGING THE PERFORMANCE OF A COMPUTER SYSTEM BASED ON OPERATIONAL CHARACTERISTICS OF THE SYSTEM COMPONENTS

(75) Inventors: David Darden Chambliss, Morgan Hill, CA (US); Prashant Pandey, Fremont, CA (US); Eric Joseph Wood, San Luis Obispo, CA (US); Peter Clayton Belknap, Sanford, CA (US); Leonard Chi Chiu Chung, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/203,867

(22) Filed: Sep. 3, 2008

(65) Prior Publication Data

US 2008/0319731 A1 Dec. 25, 2008

Related U.S. Application Data

(63) Continuation of application No. 10/306,853, filed on Nov. 27, 2002, now Pat. No. 7,457,864.

(51) Int. Cl.
*G06F 15/173* (2006.01)
(52) U.S. Cl. .......................................... 709/223; 709/224
(58) Field of Classification Search .................. 709/223, 709/224
See application file for complete search history.

*Primary Examiner* — Ramsey Refai
(74) *Attorney, Agent, or Firm* — GSS Law Group (57) ABSTRACT

A performance manager and method for managing the performance of a computer system based on a system model that includes measured entities representing the operational characteristics of the system components and relationships among the measured entities. The performance manager includes data producers for interacting with the interface agents of the components, an engine for exchanging information with the data producers and the system model, and an interaction model for determining relevant measured entities in the system model. The system model and interaction model are maintained in a repository where data might be accessed via an access interface. Incoming performance data is analyzed by an analyzer in the background to detect trends and relationships among the entities. An operator might review the relevant entities and apply controls to selected entities to manage the overall system performance as well as to resolve problems affecting the performance of the components in the system.

16 Claims, 8 Drawing Sheets

| Entity 1 | Related Entity | Score | Status |
|---|---|---|---|
| Entity 2 | Entity 1 | ▨ | |
| Entity 3 | Entity 2 | ▨ | |
| Entity 4 | | | |
| Focal Entity | | | |
| | Metric 1 | | Value 1 |
| | Metric 2 | | Value 2 |
| | | | |

SYSTEM AND METHOD FOR MANAGING THE PERFORMANCE OF A COMPUTER SYSTEM BASED ON OPERATIONAL CHARACTERISTICS OF THE SYSTEM COMPONENTS

CROSS REFERENCE TO RELATED APPLICATIONS

This application is a continuation of U.S. patent application Ser. No. 10/306,853, filed on Nov. 27, 2002 now U.S. Pat. No. 7,457,864.

TECHNICAL FIELD

This invention relates to computer systems, and more particularly to a system and method for managing the performance of the computer system based on a system model that includes performance characteristics of the system components and their relationships.

BACKGROUND OF THE INVENTION

A performance problem in a system component usually appears to the system operator as a poor response time for an application running in the system. This is the case because the application typically depends on many resources in the system for its execution, including memory, storage switches, disk drives, networks, etc. For any one application there may be hundreds of different resources with the potential to cause performance problems by being unable to satisfy the demand. Over a whole system there may be many thousands of such interrelated entities.

Currently, programs may be set up to monitor the performance of the components separately. The results are gathered into a central tool for the operator's examination. A disadvantage of this approach is that it relies on the operator's understanding and experience as to how measurements and events from different components are related. With the scale of computer systems continuing to grow, it is very difficult for the operator to manage the performance of the systems and identify system problems accurately. Furthermore, the information for each component must generally be quantized into one of a few possible states.

U.S. Patent application No. 2002/0083371A1 describes a method for monitoring performance of a network which includes storing topology and logical relation information. The method attempts to help a user in determining the main causes of network problems. A drawback of this approach is that it limits dependencies between components to the physical and logical topology of the system, where the logical topology is a subset of the physical topology. In a networked storage system there might be performance dependencies between components which are not directly connected in the physical topology. Another drawback of this method is that although the user may "drill down" to the source of a problem by navigating through "bad" states of the components, the observed problem and the actual cause might be connected through a chain of entities that are themselves not in a bad state.

U.S. Pat. No. 6,393,386 describes a system for monitoring complex distributed systems. The monitoring system builds a dynamic model of the monitored system and uses changes in the state of the monitored components to determine the entities affected by a change. It correlates events which might have been caused by the same problem to identify the source of the problem. As such, the user of the system does not have the ability to investigate conditions which the system has not recognized as faulty or degraded conditions. In addition, the system searches for reasons for a particular degradation or failure of a node in the system. Since only the nodes directly connected to the affected node are considered, this approach might lead to incomplete analysis if the system model does not completely specify all relationships between the entities.

U.S. Pat. No. 5,528,516 describes an apparatus and method correlating events and reporting problems in a system of managed components. The invention includes a process of creating a causality matrix relating to observable symptoms that are likely the problems. This process reduces the causality matrix into a minimal codebook, monitors the observable symptoms, and identify the problems by comparing the observable symptoms against the minimal codebook using various best-fit approaches. However, in a complex networked storage system, there might be several causes for a single observed problem which requires different approaches to identify these causes. In such a situation, a solution implemented by a completely automated sub-system, as described in U.S. Pat. No. 5,528,516, might not be the ideal one for the user.

Therefore, there remains a need for a system and method for managing the performance of a computer system that help the operator effectively track the performance of individual components and accurately identify problems affecting the system performance.

SUMMARY OF THE INVENTION

It is an object of the present invention to provide a system and method for managing the performance of the computer system based on a model that includes the performance characteristics of the system components.

It is another object of the invention to provide system model that maintains information about the parameters affecting the operation of the system components as measured entities and relationships among the entities.

It is still another object of the invention to provide an interaction model for maintaining information about an operator's interaction with the system model to help the operator identify and resolve a problem affecting the system performance.

It is a further object of the invention to provide an operator interface through which the operator might review the performance of the components and initiate changes to improve the system performance or to resolve performance problems.

To achieve these and other objects, the present invention provides a performance manager that includes a system model, one or more data producers, and an interaction model. The system model represents the state of the computer system based on the operational characteristics of the system components as supplied by the data producers. The system model includes measured entities that correspond to the components in the system and relationships that represent the effect one measured entity has on the operation of another entity. Each measured entity is associated with as set of metrics and controls for changing the metrics. The data producers communicate with the managed components through the interface agents associated with the components and provide the system model with the performance, configuration and diagnostic information about the components. The interaction model determines the most relevant entities affecting the performance which are then presented to the operator through a visualizer. Through the interaction model, the visualizer also allows the operator to apply changes to the controls of selected measured entities.

The performance manager also includes an engine for exchanging information with the data producers and the interaction model. The interaction model and the system model are typically maintained in a data repository such as a relational database. Components of the performance manager access data in the repository through an access interface. In the preferred embodiment of the invention, the performance manager further comprises an analyzer for analyzing in the background the performance data and detecting trends affecting the performance of the system.

The invention also includes a method for managing the performance of a computer system using the performance manager. The method allows the operator to examine the relevant measured entities, their measurements, and associated metrics. Through the visualizer, the operator might affect controls to the selected entities to improve the system performance and identify the components that need attention in interaction sessions.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

The invention will be described primarily as a system and method for managing the performance of a computer system based on a model that includes performance parameters of the components in the system. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 1:
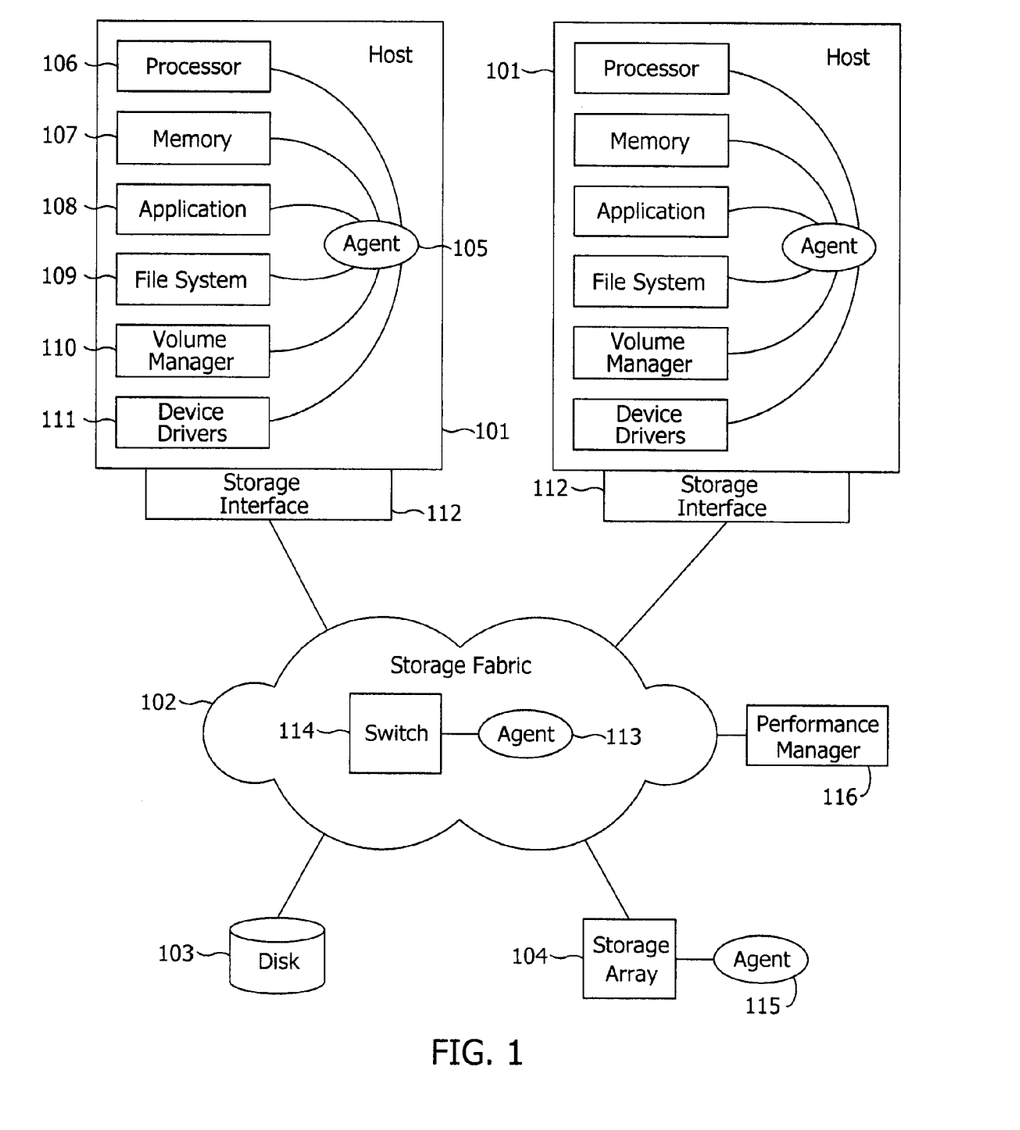
FIG. 1 is a schematic diagram showing the performance manager of the invention together with a typical managed computer system.

FIG. 1 is a block diagram showing a simple computer system that is managed by a performance manager in accordance with the invention. The computer system includes multiple storage client hosts 101, a storage fabric 102 between the client hosts 101 and back-end storage devices such as a disk 103 and a RAID storage array 104. Each client host 101 might have one or more of processor 106, memory 107, application 108, file system 109, logical volume manager 110 and storage device drivers 111. Although FIG. 1 shows a simple computer system, a typical computer complex managed by the invention may include hundreds of client hosts 101 that are connected to hundreds of back-end storage devices 103-104 through multiple sub-networks as the storage fabric 102. The hosts 101 communicate with the storage fabric 102 through storage interfaces 112. The storage fabric 102 usually comprises several network switches and network devices like the switch 114. A performance manager 116 manages the components in the system through the storage fabric 102.

In accordance with the invention, some of the components in the managed system include a management interface through which external entities can extract performance information and operational state information from the components and can also control certain operational parameters of the components. Most system components like client hosts, servers, network switches/hubs and storage devices already have such management interfaces. An example of management interfaces that can be exposed by storage devices is described in "Bluefin—A Common Interface for SAN Management," a White Paper by the Storage Networking Industry Association, Disk Resource Management Work Group (SNIA-DRM), August, 2002. If a particular component needs to be managed but does not include a management interface, then an agent like the Simple Network Management Protocol (SNMP) agent may be added to the component. It is well-known in the art how an SNMP agent can be implemented to provide the required interface functions. See, for example, "Essential SNMP," by Douglas Mauro et al, October, 2001.

FIG. 1 shows an agent 105 for supporting the components 106-111 in a client host 101. An agent 113 supports the switch 114 of the storage fabric 102, while an agent 115 supports the storage array 104. The number of agents needed to manage a computer system and the decision as to which system components are supported by a particular agent depend on a particular system configuration and the desired implementation. Typically, one or more agents are set up to support a group of similar or related components. Using the operations described below in reference to FIGS. 2-8, the agents in the system, such as the agents 105, 113, and 115, provide the performance manager 116 with the performance characteristics of the managed components and allow their operational parameters to be controlled to improve the overall system performance. The performance manager 116 can interact with the agents over either the same storage fabric (in-band communication) or a separate multi-purpose network (out-of-band communication).

Figure 2:
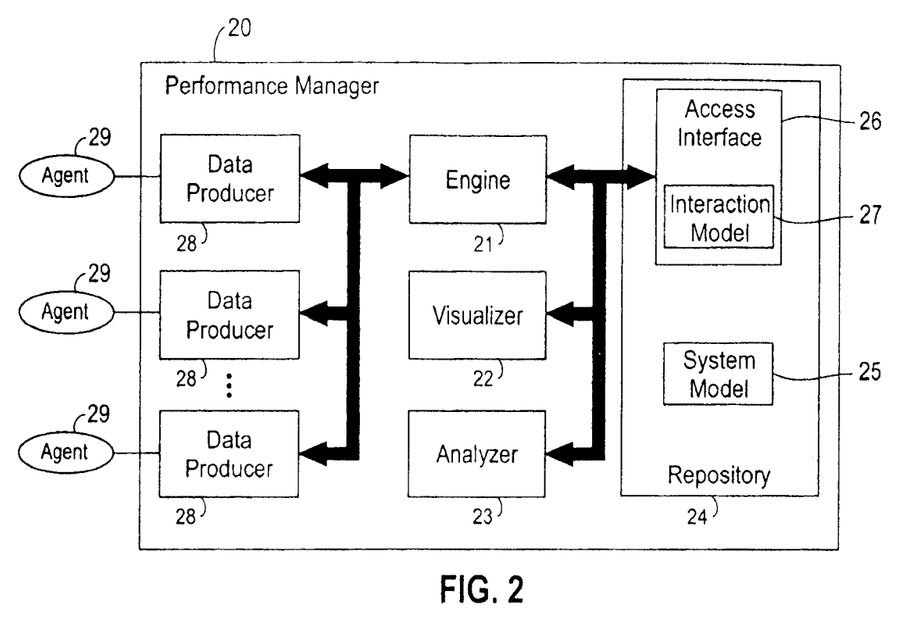
FIG. 2 is a block diagram showing the main components of the performance manager of the invention.

FIG. 2 is a block diagram showing the main components of the performance manager of the invention. The performance manager 20 includes one or more data producers 28, an engine 21, and a repository 24 that contains a system model 25 and an access interface 26. The access interface 26 includes an interaction model 27. The data producers 28 communicate with the agents associated with the managed components, typically in a one-to-one relationship. The repository 24 is where the performance data on the system components are recorded and retrieved reliably by the performance manager 20. The system model 25 contains the performance characteristics of the system components and their dependencies.

The repository 24 could be an off-the-shelf relational database management system with a database schema for supporting the system management functions. The repository 24 includes appropriate access methods for external components to access data in the repository via the access interface 26. The schema and access methods support the storage, maintenance, and retrieval of a system model 25 which represents the state of the computer system, in the form of data objects. The access interface 26 has a set of access methods and maintains information about the interaction model 27. The interaction model 27 keeps track of state information needed to allow the data accessors to interact with the system model 25.

The engine 21 includes functions for communicating with the data producers 28 and the access interface 26 of the repository 24. Through the engine 21 and the access interface 26, the data producers 28 provide performance information to the system model 25. The engine 21 is responsible for exchanging information with the data producers 28 either through a "pull" model, where the engine initiates the exchange or a "push" model where the data producer initiates the exchange. The engine 21 is also responsible for deciding which information needs to be made persistent in the repository 24 and how to evaluate the operational status of the managed components, in conjunction with the data producers 28.

Each data producer 28 presents data to the repository 24, through the engine 21, where the data represent the current operational status of one or more components in the managed system. The data producers 28 are parts of the performance manager 20 that have the ability to communicate with the management interfaces or agents for the components in the managed system. Each data producer 28 provides the engine 21 with a list of the data objects, referred to as measured entities and described below in reference to FIGS. 3-5. The measured entities correspond to the components that the data producer are associated with. Each measured entity includes the operational characteristics, referred to as metrics, of the corresponding component. The system model also includes data objects called relationships which represent the effect that one measured entity has on the operation of another measured entity. The measured entities and their relationships are maintained in the system model. For example, for the computer system shown in FIG. 1, the system model might include one measured entity for each processor 106 and memory 107 in each host. It might also include several measured entities representing logical volumes, information about which comes from the volume manager 110 on the host 101.

In the preferred embodiment of the invention, the performance manager 20 further includes a visualizer 22 and one or more analyzer 23. The visualizer 22 provides a user interface through which human users could interact with the performance manager 20. It includes facilities which display the status of the measured entities and the controls that affect the entities. These facilities also allow the user to navigate through the displayed entities to diagnose and resolve a problem that affects the performance of the system.

The analyzer 23 is responsible for analyzing the incoming data and applying data mining techniques to discover trends as well as relationships that exist between measurements of the different entities. The data analysis is preferably implemented as a background task. An example data mining process is described in "Data Mining: Exploiting the Hidden Trends in Your Data," by Herb Edelstein," DB2online Magazine, Spring 1997. The analyzer 23 is also responsible for making changes to the system model 25, as described below, when the management system is used to apply controls to the entities in the managed system.

Figure 3:
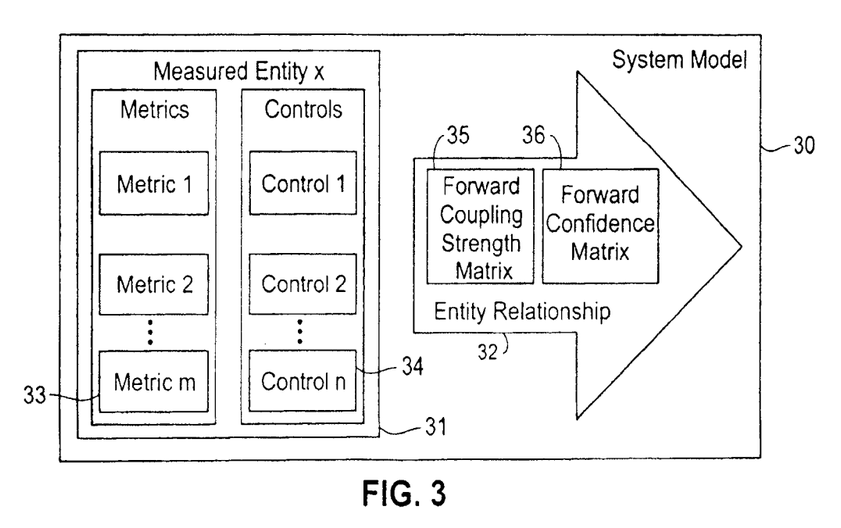
FIG. 3 is a block diagram showing a preferred embodiment of the system model in accordance with the invention.

FIG. 3 illustrates the key components of a system model 30. The system model 30 contains two types of information: one or more measured entities 31 and one or more entity relationships 32. Each measured entity 31 corresponds to a facility or operation in one or more managed system components. Associated with each measured entity 31 are one or more metrics 33. Each metric 33 is associated with a measurement of its measured entity 31 that has the potential to change over time. When prompted, a data producer (item 28 of FIG. 2) provides a list of all metrics 33 associated with a given measured entity 31. It also provides the current value and possibly recent values of any given metric. Each metric 33 is additionally associated with information that identifies and describes the metric 33 to the operator and to the analyzer (item 23 in FIG. 2). This information includes the identity of the data producer which is responsible for supplying data about the measured entity 31, including the values of the metrics 33. The descriptive data may include reference values that represent expected values, upper or lower limits, or thresholds for consequences. The descriptive data may also include classification by category.

Associated with each measured entity 31, there might be one or more controls 34 which are subject to changes by the system operator or by the performance manager. Each data producer provides to the engine (item 21 in FIG. 2) a list of all controls 34 associated with a given measured entity 31. For each control 34, this data producer provides the engine with information that determines how the control 34 is to be presented in the user interface to permit the system operator or the performance manager to make changes or take actions. This may, for example, be represented as a Java Bean. The parameters subject to change by a control 34 may themselves be metrics 33 of the same measured entity 31.

An entity relationship 32 specifies knowledge in the system model about how two measured entities 31 are related. An entity relationship 32 can be used, for example, to represent the correlation between the performance of a database application and a disk on which the data for the application is stored. These relationships are exploited by the system and method of the invention to improve the performance of the managed system. Associated with the entity 32 are a Forward Coupling Strength matrix 35 and a Forward Confidence matrix 36. These matrices will be described in reference to FIG. 5.

Referring again to FIG. 2, the performance manager 20 collects, via its data producers 28, and records in its repository 24 the identifying and descriptive information of each data producer 28, measured entity 31, and metric 33. It also records periodic samples of the values of metrics, and records them in the repository 24 for future use. A policy-based mechanism might be used to determine how long the knowledge of the metric values must be preserved.

In addition to the measured entities 31 and metrics 33, the performance manager 20 also collects and maintains in the system model 25 data objects that represent the entity relationships 32. The entity relationships 32 are created and changed in several ways as described later in the specification. In the simplest form, the data producers 28 supply data for defining these relationships. The engine 21 provides to the data producers 28 information that identifies and describes all of the measured entities 31 and metrics 33, so that a data producer 28 may create or modify relationship objects for measured entities 31 that are serviced by other data producers 28.

Figure 4:
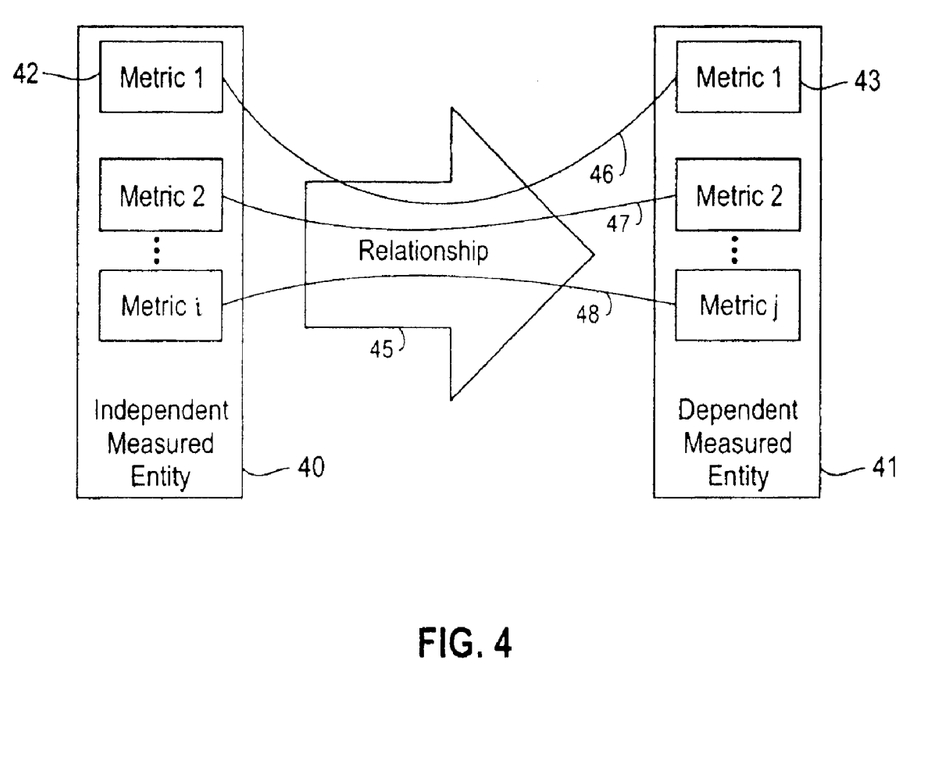
FIG. 4 illustrates a typical relationship between an independent measured entity and a dependent measured entity.

FIG. 4 illustrates how two measured entities are related to each other by a relationship 45. The relationship 45 is represented as a large arrow originating from a measured entity 40, referred to as an independent entity, and pointing to a measured entity 41, referred to as a dependent entity. The direction of the relationship is said to be from the independent to the dependent. There is at most one relationship for a given ordered pair of entities. So, it is possible that two entities are in two relationships, one in which the first entity is independent and another in which the second entity is independent. The entity relationship contains information about how the metrics of the independent measured entity affect the metrics of the dependent measured entity, which are referred to as dependencies. FIG. 4 shows three dependencies 46, 47 and 48 between the independent entity 40 and the dependent entity 41. For example, the dependency 46 is between metric 42 of entity 40 and metric 43 of entity 41.

The relationship 45 also contains data from which several coupling matrices can be derived, each of which contains one value for each combination of a metric of the independent entity with a metric of the dependent entity. The basic form of these matrices has a number of rows equal to the number of metrics of the independent measured entity and a number of columns equal to the number of metrics of the dependent measured entity. An entry $M(x,y)$, which is in the x-th row and y-th column of a matrix M, relates to the x-th metric of the independent measured entity and y-th metric of the dependent measured entity. There are two basic coupling matrices, from which other matrices can be derived:

(1) The Forward Coupling Strength (FCS) matrix: the value of an entry $M(x,y)$ in the Forward Coupling Strength matrix is a value between −1.0 and 1.0. It indicates the relative magnitude and direction (i.e., positive means increasing and negative means decreasing) of a change in the y-th metric of the dependent entity that is caused by a change in the x-th metric of the independent entity.

(2) The Forward Confidence (FC) matrix: the value of the entry $M(x,y)$ in the FC matrix is a value between 0.0 and 1.0 that indicates the likelihood that the change described by the forward coupling strength will apply. A value of 1.0 means that the relationship is always expected to be present and have an effect. This could be the case, for example, if there is a direct functional relationship between the two metrics. A value of 0.0 means that there is no knowledge of a relationship, and in this case the value of the Forward Coupling Strength matrix should be ignored.

It is possible for the independent (or parent) entity and the dependent (or child) entity in a relationship to be the same entity. This is used to represent the fact that metrics of a measured entity are dependent on other metrics of the same entity. The coupling matrices could be stored in the form of a list enumerating all entries. However, such an implementation is usually avoided because of the potentially large amount of data involved. The Forward Coupling Strength and Forward Confidence matrices are considered to be sparse matrices in which most entries are assumed to have the same default value, which could be but is not necessarily zero. Entries whose values are non-default are listed, in the form of data objects called dependencies 46. Each dependency specifies the identity of a cause metric, the identity of an effect metric, and values for strength and confidence. If the system model contains no relationship object for a given pair of entities, there is an implicit default relationship for which the values of all matrix elements are zero, and the system behavior is as if a relationship with these values were contained in the system model. The concept of dependencies can easily extended to include controls. For example, for a measured entity representing an application, the metric measuring the transactions per second, could be the effect metric in a dependency where the control for number of threads used by the application is the cause control.

Figure 5:
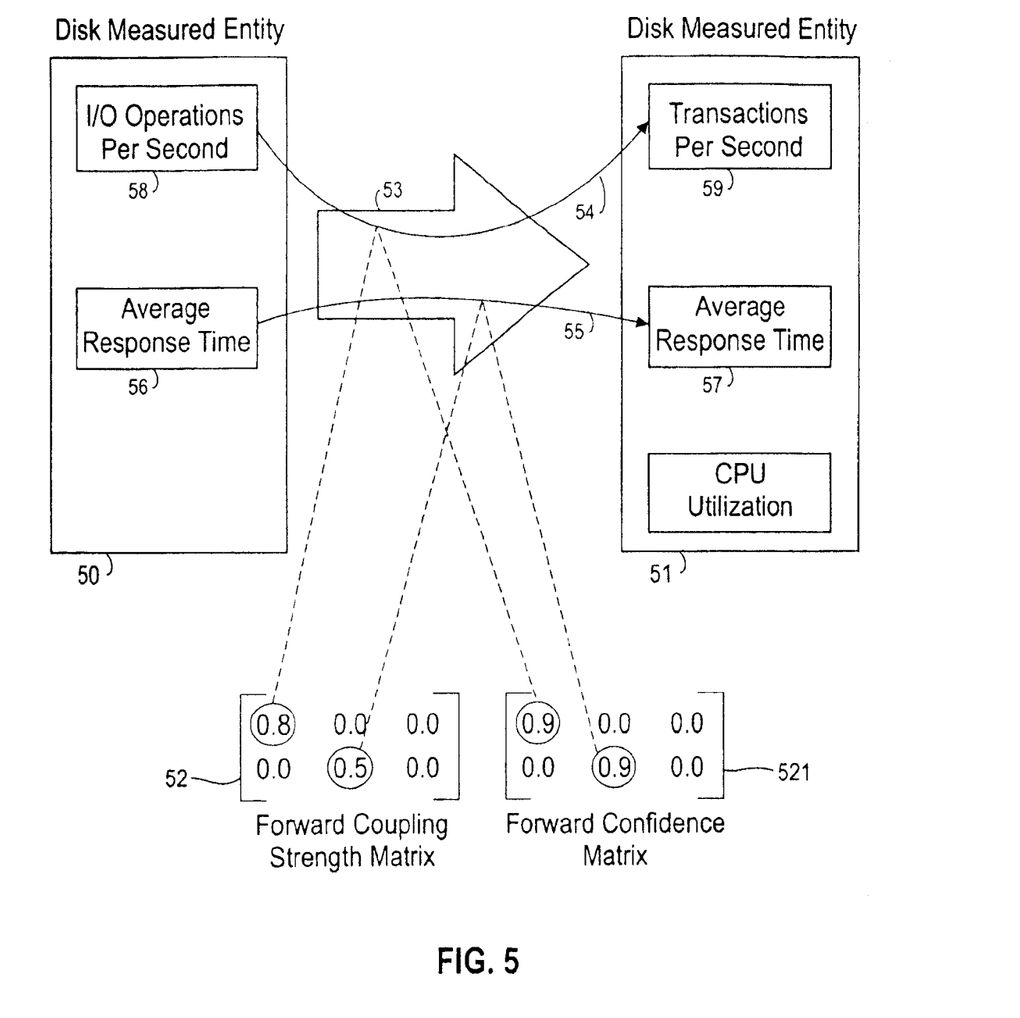
FIG. 5 illustrates an example of the Forward Coupling Strength matrix and the Forward Confidence matrix that are derived from a relationship between a disk measured entity and an application measured entity.

An example of two related measured entities are shown in FIG. 5. The metrics of the application measured entity 51 depend on the metrics of the disk measured entity 50. These dependencies are represented by a relationship 53, which includes two example dependencies 54 and 55. The dependency 54 represents that the "transactions per second" metric 59 of the application measured entity 51 is related to the "I/O operations per second" metric 58 of the disk measured entity 50. In the dependency 55, the "average response time" metric 57 for transactions delivered by the application is related to the "average response time" metric 56 for I/O operations delivered by the disk. FIG. 5 also shows a Forward Coupling Strength matrix 52 and a Forward Confidence matrix 521 as an example. There is a row in the matrices 52 and 521 for each metric of the disk measured entity 50 and a column for each metric of the application measured entity 51. As an example, the second column of the second row positions of the matrices 52 and 521 correspond to the dependency 55, which states that the average response time per transaction of the application is dependent on the average response time per I/O of the disk. This dependency has a strength of +0.5 (from the Forward Coupling Strength matrix 52), and the management system has 90% confidence that this dependency exists (shown as 0.9 in the Forward Confidence matrix 521).

The relationships in the system model, such as the relationship 45 of FIG. 4, are created and modified via several paths:

(1) By the data producer: an example of this case is where the data producer for a storage system defines the measured entities for the logical disks that are visible to the storage clients. The data producer would provide the relationships between the logical disks and the physical disk ranks that show that the load on the physical ranks is dependent on the load to the logical disks, and that the performance of the logical disks is dependent on the performance of the physical disk ranks.

2) Manually entered: for example, the operator selects two measured entities and designates them as related, by manual input.

3) Rules driven: a set of rules is provided to the control program that defines patterns for relationships. The database is scanned for pairs of entities that match these patterns. These patterns might be expressed as SQL queries to the relational database of entities and metrics.

4) Action inferred: when the user takes actions such as the application of controls in response to a particular performance short-fall, the performance manager can assume a tentative causal link between entities directly related to the shortfall and the entity to which the control is applied.

5) Indirect (transitively inferred): when there are two relationships: one between an entity x as the independent and an entity y as the dependent, and another relationship between the entity y as the independent and an entity z as the dependent, then a relationship may be automatically generated with x as the independent and z as the dependent. This is done as a background activity in the system model. A pre-filtering step selects only those relationships with high enough values in the Forward Coupling Strength and Forward Confidence matrices, and pairs are selected for defining a candidate relationship. The strength and confidence matrices of the candidate relationship are computed as the matrix product of the original two relationships, and a threshold-based criterion is used to determine whether the candidate is accepted into the system model.

6) Statistically adjusted: statistical correlation of metric values is used to adjust the values in the Forward Coupling Strength matrix and, in some cases, the Forward Confidence matrix as well. In the preferred embodiment, the dependencies contained within relationships are of different types that indicate the source and the bounds of possible confidence, and these type values determine when and how statistical correlation can be used to adjust the numerical values.

7) Navigation inferred: weak dependencies are inferred from the fact that the operator has chosen to navigate a path from a specified starting point to a given focus entity in a session, even if no action is taken.

8) Statistically inferred: data mining approaches are used to detect correlations between entities for which relationships are not yet known.

In accordance with the invention, a set of criteria for evaluating measured entities are associated with the system model. The different criteria are referred to as temperature scales. Given a temperature scale, at a point in time, the system model defines a numeric value for each entity denoted as its Absolute Entity Temperature (AET) measured with respect to that scale. It likewise defines a list of numeric values, one for each metric and control of the entity, denoted as the Absolute Temperature Vector (ATV) measured with espect to that temperature scale. Each value is a nonnegative real number.

Each temperature scale denotes a context of problem solving or performance analysis, and the temperature measured with respect to it represents the likely importance or benefit of examining or acting on the entity, metric or control in question within that context. For example, the identification of recent operational failures, the identification of current performance shortfalls, and the prediction of future problems are three contexts each of which may be represented by a separate temperature scale. In general, the temperature (for a given entity and a given temperature scale) is determined from the current and historical values of its metrics. For example, in the context of current performance shortfalls, measured entities that are failing to meet requirements are assigned a high temperature, as are the metrics most nearly responsible for the failures (i.e., those for which an improvement would be most likely to eliminate the measured entity's failure). Measured entities and metrics that are safely out of the failure state would be assigned low temperatures, and those which may be considered marginal are assigned intermediate values.

Absolute temperatures, and context-specific temperatures derived from them, are used in the visualizer and the interaction model to determine the interaction priorities that guide the operator. This use is described below as part of the interaction model 27 of FIG. 2. The interaction model creates thermometers for the different temperature scales being used in the system. The thermometer is simply an object which applies the criteria of its temperature scale to an input metric or entity and is able to output the current temperature with respect to its temperature scale. Note that the term "temperature" is used to match the notion of "hot spot" as a component needing attention or correction.

The performance manager contains a temperature scale list that includes one or more generic scales representing general analysis contexts, like the three example contexts provided above. Several thermometers based on the generic scales for computing temperatures might be provided, such as:

1) Threshold thermometer: this thermometer designates a set of metrics, and for each metric in the set, the thermometer designates a reference value, a weight, and a direction selector. The direction selector might have the value of −1, 0, or +1. For each metric, the thermometer obtains a difference by subtracting the current measured value from the reference value. If the direction selector is zero or if the difference has the same sign (positive or negative) as the direction selector, then the difference is retained as calculated, otherwise the difference is set to zero. A score function is defined as the weighted sum of squares of these differences. The threshold thermometer is used to examine current failures or potential failures with respect to performance targets, by setting reference values at or near the target limits and using +1 or −1 as the direction selectors. It is also used to detect and highlight deviations from normal by the use of zero as the direction selectors.

2) Future trend thermometer: this thermometer designates duration of concern, a set of metrics and, for each metric in the set, a reference value, a weight, and a direction selector. A score function is defined as for a threshold thermometer with the same parameters, except that the calculation uses a prediction of the metric value in the future, extrapolated by the duration of concern, in place of current measured values.

3) Threshold-crossing thermometer: this thermometer indicates that a metric has exceeded a threshold. The metric temperature is set to a constant for that metric which has crossed the threshold, and zero for all other metrics.

4) Dynamically generated thermometer: when there is a performance shortfalls, the system model can create a dynamically generated thermometer for the situation. For example, if two metrics of a measured entity are both above a threshold (which causes the performance manager to generate a thermometer), then the temperature values for those metrics (in the ATV created with the use of this thermometer) will be high, and the temperature values for other metrics will be low.

As an illustration of the use of thermometers to generate AETs, consider the following example. The performance manager might notice that the disk measured entity 50 shown in FIG. 5 has a performance shortfall in the response time metric. Based on this situation the performance manager creates a dynamically generated thermometer which generates an ATV using the formula:

metric temperature=(current metric value)/(metric threshold).times.100]

and computes the AET as:

AET=current metric temperature of average response time metric

Thus, if the average response time target is 2 ms and the current measured time is 3 ms, then the metric temperature for the average response time metric and the AET for the disk entity will be (3)/(2).times.100, that is 150. The computation of absolute temperature may be done within the engine in reference to data contained in the system model, or may involve reference to the measured entity's data producer.

Figure 6:
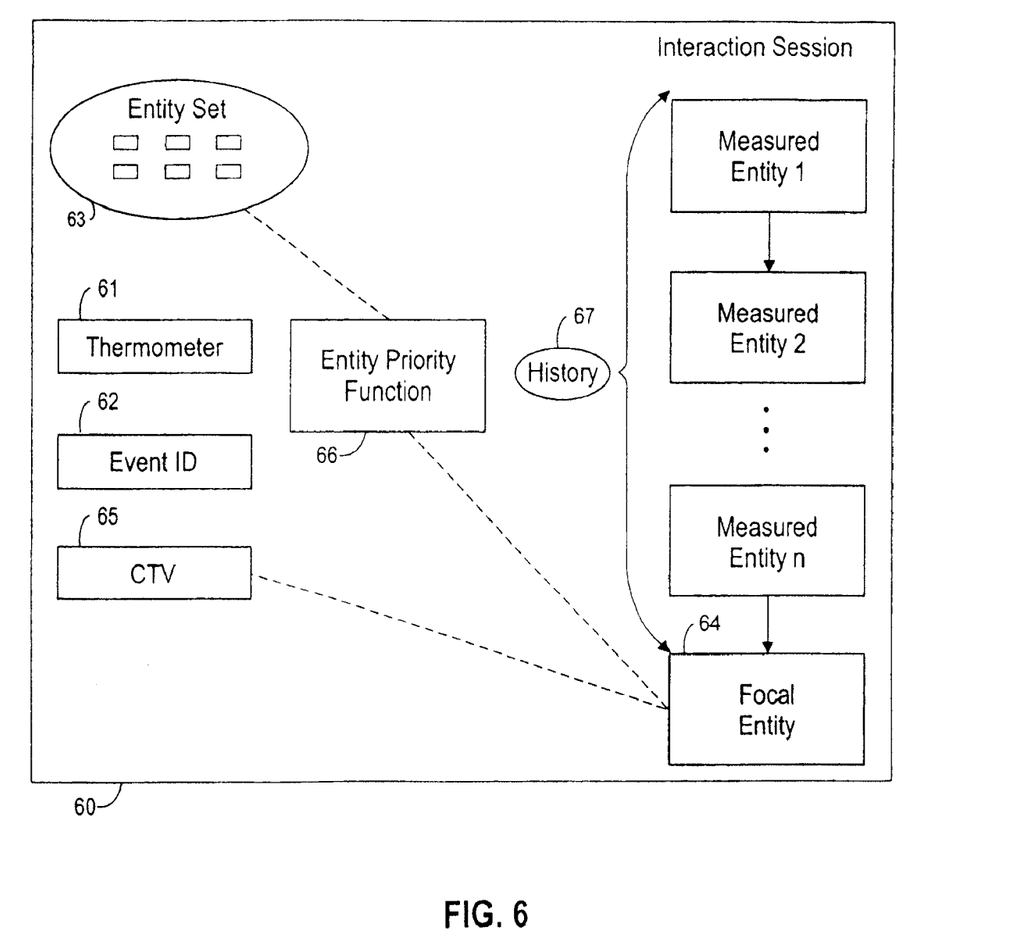
FIG. 6 is a block diagram showing a preferred embodiment of the interaction model in accordance with the invention.

FIG. 6 illustrates a preferred embodiment of an interaction session 60. The interaction session 60 represents the state and progress of the interaction between the operator or other agent on the one hand and the system model on the other. The selection and display of data and the changes to the controls occur in association with a session. The session 60 is typically created when the operator starts a particular task (such as fixing a particular problem) and it is deleted when the task is completed, and the actions done to perform the task are usually associated with that session. The association between operator actions and session state happens through the visualizer (item 22 in FIG. 2).

The session 60 combines information about the problem being solved with information about the managed system so as to guide the operator's decisions. Each session 60 contains a thermometer 61, an event identifier 62, a measured entity set 63, a focus entity 64, a Context Temperature Vector (CTV) 65, an entity priority function 66, and a history 67. The thermometer 61 identifies the temperature scale being used by the session. The event identifier 62 either selects a particular event contained in the system model or contains a value that designates that there is no association with an event. The measured entity set 63 identifies a set of the measured entities considered to be relevant to the operational characteristics of the focus measured entity. The focus entity 64 identifies one measured entity which is the current focus of the task, or it may indicate that no entity is the focus entity. The CTV 65 specifies a nonnegative numerical value for each metric and control of the focus entity that represents the likely importance or benefit of changing that metric or control in the context defined by the session. The entity priority function 66 defines numerically the relative priority of each entity in the measured entity set 63 for the next interaction step. The entity priority function 66 may be a list of numeric values, one for each entity in the measured entity set 63. The history 67 includes the sequence of interactions that have occurred in this session. It preferably consists of a list of the focus entities 68 that have been selected, their associated data and the corresponding CTV 65 in the order the entities were focused on.

Figure 7:
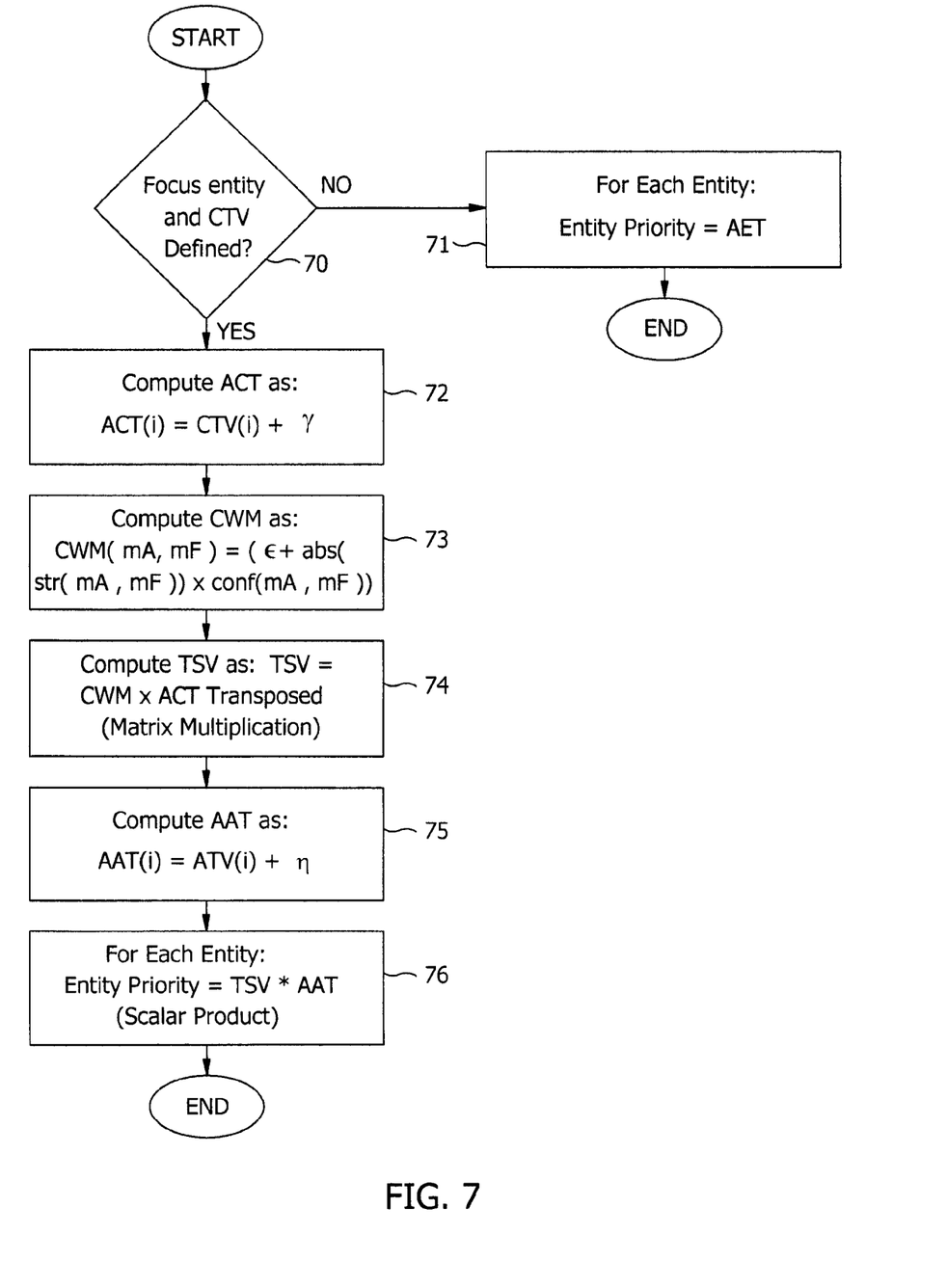
FIG. 7 is a flow chart showing a preferred process for computing an entity priority as part of the interaction model.

The computation of the entity priority function is shown in FIG. 7. The entity priority function is defined in one of two ways, depending on whether a focus entity (FE) and CTV are defined for the session (step 70). If either the focus entity or the CTV is not defined for the session, then the entity priority function is computed as the Absolute Entity Temperature (AET) of the given entity measured with the thermometer of the session, in step 71. If both the focus entity and the CTV are defined, then the value of the entity priority function for a given entity is defined as the matrix product of:

a weight matrix computed from the coupling between entities (where the focus entity is the dependent entity), the transpose of an adjusted version of the CTV of the session, and an adjusted version of the ATV of the given entity.

Specifically, the process for computing the entity priority function includes the following operations:

1) ACT computation (step 72): the Adjusted Context Temperature (ACT) is computed from the CTV so that every entry in the ACT has a value at least equal to a parameter called .gamma., set in the configuration of the control program. The value of .gamma. is typically about 5% of the maximum value of metric temperature recently computed. In the preferred embodiment of the invention, the value of ACT(i) is computed as:

ACT(i)=CTV(i)+.gamma..

2) CWM computation (step 73): the coupling weight matrix or CWM for a given entity is computed from the relationship, if any, for which the given entity is the independent and the focus entity is the dependent. If such a relationship is present in the system model, then the CWM is computed as a combination of the Forward Coupling Strength matrix and the Forward Confidence matrix, element by element. In the preferred embodiment of the invention, this is accomplished by combining the matrices element by corresponding element, via the function:

CWM(mA, mF)=(.epsilon.+abs(Strength(mA, mF)).times.Confidence(mA, mF))

where mF and mA are the identifiers for the metrics of the focus entity and the other entity, epsilon. is a constant adjusted in the configuration of the control program, and abs( ) is the absolute value function. A representative value for .epsilon. is 0.1.

3) TSV computation (step 74): the Temperature Sensitivity Vector (TSV) for a given entity is computed by multiplying the CWM for the given entity with the transpose of the ACT, by the usual rules of matrix arithmetic. The TSV has a value for each metric or control of the given entity.

4) AAT computation (step 75): the Adjusted Absolute Temperature (AAT) for a given entity is computed from the ATV of the given entity measured with the thermometer of the session, so that every entry in the AAT has a value at least equal to a parameter called eta., set in the configuration of the control program. The value of .eta. is typically about 5% of the maximum value of metric temperature recently computed. In the preferred embodiment of the invention, the value of AAT(i) is calculated as:

AAT(i)=ATV(i)+.eta..

5) Priority function computation (step 76): the priority function value for a given entity is computed as the scalar product of TSV for the given entity with the AAT for the given entity.

As an illustration, consider the relationship shown in FIG. 5. Assume that the ATV for the disk measured entity is (60, 150), the ATV for the application measured entity is (40, 125, 65), and that the application measured entity is the first entity selected in an interaction session. The application measured entity becomes the focus entity and the CTV is set to be the ATV of the application measured entity. The computation of the entity priority value for the disk measured entity proceeds as follows:

1) ACT Computation (Step 72):
Assume that the value of .gamma. is 10.

ACT=[40+10, 125+10, 65+10]=[50, 135, 75]

2) CWM Computation (Step 73):
Assume that the value of .epsilon. is 0.1,

CWM(1, 1)=(0.1+abs(0.8).times.0.9=0.81

CWM(2, 2)=(0.1+abs(0.5).times.0.9=0.54

CWM(1,2)=CWM(1,3)=CWM(2,1)=CWM(2,3)= (0.1+abs(0.0)).times.0.0=0.0

Thus, the CWM is the following matrix: 1 [0.81 0.0 0.0 0.0 0.54 0.0 ]

3) TSV Computation (Step 74): 2 [0.81 0.0 0.0 0.0 0.54 0.0][50 135 75 ]=[0.5 72.9 ]

4) AAT Computation (Step 75):
Suppose the value of .eta. is 10, then

AAT=[60+10, 150+10]=[70, 160]

5) Priority Function Computation (Step 76):
Scalar product of 3 [40.5 72.9]
and [70, 160] is ((40.5.times.70)+(72.9.times.160))=14499

The primary part of the entity priority value is the factor (72.9.times.160), which is based on the temperatures of the average response time metrics of both the disk measured entity and the application measured entity. This is desired because in the example, the application response time exceeds its threshold value and the entities affecting this response time should have a higher priority when an operator looks for the source of the problem.

In the preferred embodiment of the invention, the intermediate vectors and matrices are not computed explicitly but their contributions to the priority function value are computed and aggregated. The interaction model may also contain control data such as security information for identifying individual operators and the data to which they have access. In addition, each session (item 60 in FIG. 6) contained in the interaction model is created and used via the visualizer. A display is presented to the operator of the entities in the measured entity set of the session. The rendering of the display directs the operator's attention primarily to the focus entity (if one is defined) and to those entities that have the highest value of the entity priority function. It also permits the operator to select one of these entities as the next focus entity (item 64 in FIG. 6), or to change the other objects contained in the session. The display may provide additional information on the entities that it presents, such as the current values of their metrics, and options to allow the operator to act on the controls of the entities.

Figure 8:
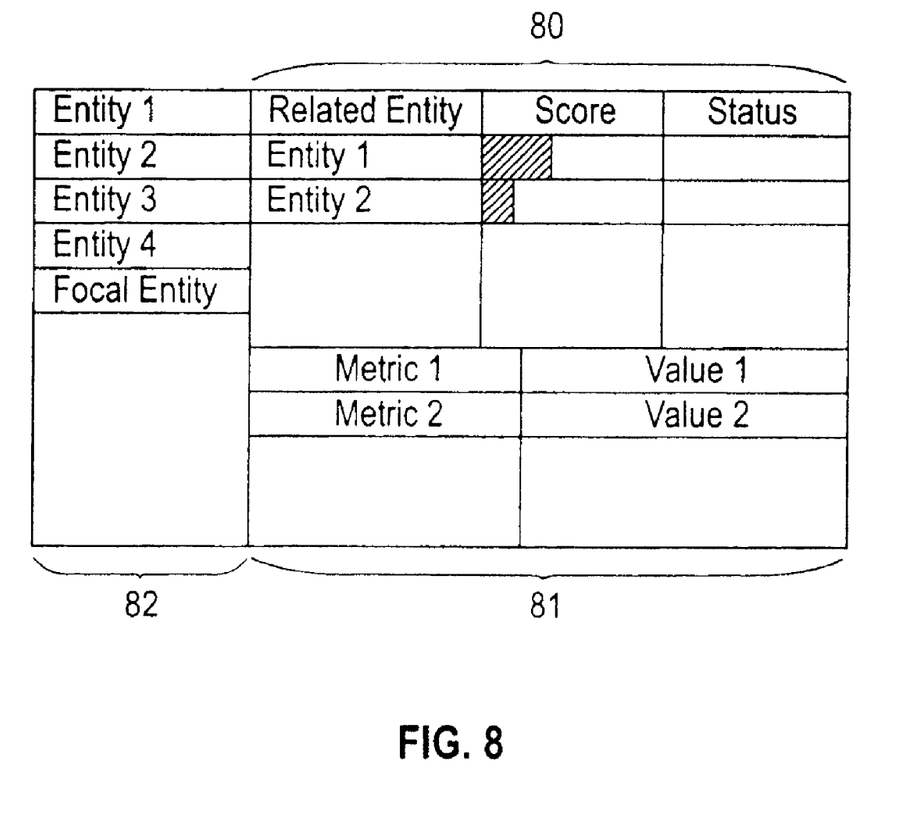
FIG. 8 illustrates a display by the visualizer to an operator as a result of an interaction session by the operator.

FIG. 8 shows an example of the display to the operator. The display is preferably associated with an interaction session and is displayed as a window on the operator's console. It includes a table 80 in which each row corresponds to a measured entity, with the entities having the high scores being at the top of the table 80. The operator may select one of the entities as the next focus entity using a pointing device like a mouse. Other cues like color, icon size and apparent distance, clarity, and sounds might also be used to direct the operator's attention. A second table 81 presents additional data on a particular entity, which need not be the focus entity, and includes a facility to view metrics and to select and act on the controls of this particular entity. The display further has a table 82 which shows the history of the operator's navigation and allows the operator to back-track to any of the previous navigation steps.

The visualizer allows an operator to use an interaction session to navigate to the source of a performance problem while the interaction model session (item 60 in FIG. 6) keeps track of this navigation. The visualizer provides the following main functions for navigation with stated consequences:

FESELECT (f): Select entity (f) as the new focus entity (item 64 in FIG. 6), a forward step.

CONTROL (e, c, a, v): Apply action (a) to control (c) in entity (e) with an optional association to event (v).

The FESELECT(f) navigation action selects entity (f) as the new focus entity (item 64 in FIG. 6) of the interaction session. The user might effect this action by selecting an entity represented in table 80 using a pointing device. The following actions result from this step:

The current focus entity is appended to the history (item 67 in FIG. 6) of the session along with the CTV.

A new CTV is computed and applied. If the CTV is defined in the current session state, then a new value for the CTV is computed with values equal to the temperature sensitivity vector or TSV for the entity designated as the new focus entity, as defined above. If the CTV is not defined in the current session state then a new value for the CTV is computed as the ATV of the newly chosen entity, measured with the thermometer (item 61 in FIG. 6) of the session.

The focus entity is set to the newly chosen entity.

The entity priority function (item 66 in FIG. 6) is computed and recorded at the time of the action, according to the procedure specified above.

The display is adjusted to match the changes in session state.

The CONTROL(e, c, a, v) navigation action applies action (a) to control (c) in entity (e) with an optional association to event (v). The user might effect this action by using input devices to manipulate table 81. The following steps result from this action:

If no event (v) is specified, and an event is defined for the session, then the event of the session is used as the value v in the steps below.

The control change is effected by communication to the system model and the control analyzer.

The analyzer is notified of the control action and its parameters, and of the session history (item 67 in FIG. 6).

The actions of the analyzer based on the notification of a control action from the interaction session cause changes to the relationships in the system model. In brief, the system is updated to show that the control (c) of entity (e) is a likely cause of changes in the metrics which were important when the session was started. An initial change in values is made with a moderate confidence level just because this action was chosen, and this is followed up later by increased strength and confidence if the monitor data confirms that the metrics exhibited a change after the action was taken.

In addition to the core navigation operations described above, the preferred embodiment of the invention provides the following functions for navigating through an interaction session.

REVERT: Return to a previous session state

REFRESH: Refresh the session state

EVENT (v): Select an event (v) with which the session is to be associated.

Referring again to FIG. 6, the REVERT action restores the values of the focus entity (item 64), CTV (item 65, if one is defined) and entity priority function (item 66) to the values most recently saved in the history 67. Those values are then removed from the history. The operator might effect this action by using a pointing device to select the last entity shown in the history table 82 of FIG. 8.

The REFRESH navigation action recomputes the CTV 65 (if one is defined) and the entity priority function 66 based on current monitoring data in the repository. The display is adjusted to the changed values.

The EVENT(v) navigation action allows the operator to choose an event associated with the session during the course of the navigation. The event identifier 61 of the session is set to that of the supplied event. As a result, the thermometer of the event is used or future updates.

Figure 9:
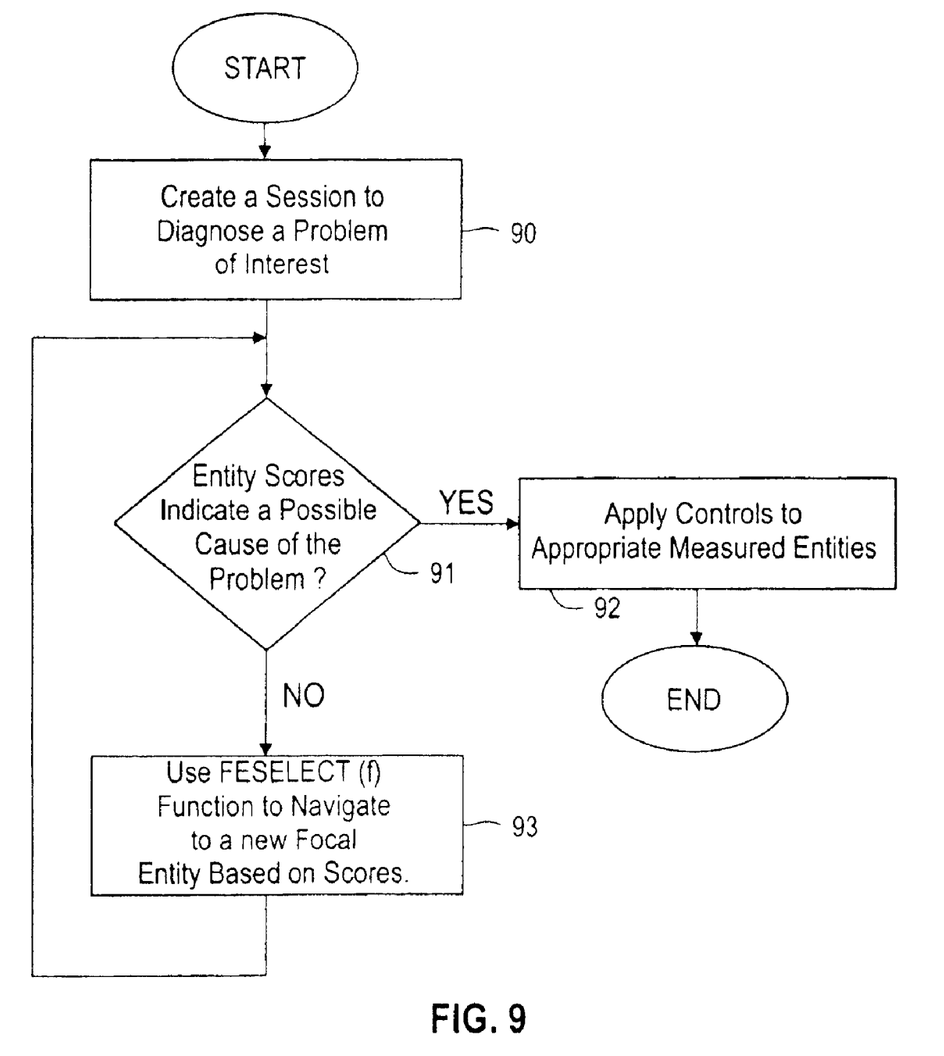
FIG. 9 is a flowchart showing a preferred process for diagnosing a system performance using the performance manager of the invention.

FIG. 9 illustrates a process through which the operator might use the performance manager to diagnose a problem in the managed system. At step 90, the operator creates an interaction section. At step 91, the operator examines entity scores in the table 80 of FIG. 8 to see if for one of the displayed measured entity might be the possible cause of the problem. If a measured entity is the likely cause, the operator applies controls for that entity in step 92. If none of the displayed entities appears as the likely source of the problem, the operator uses the FESELECT(f) function to navigate to a new measured entities based on their scores. The FESELECT(f) function is repeated until a likely cause of the problem is identified and corrected.

While the present invention has been particularly shown and described with reference to the preferred embodiments, it will be understood by those skilled in the art that various changes in form and detail may be made without departing from the spirit and scope of the invention Accordingly, the disclosed invention is to be considered merely as illustrative and limited in scope only as specified in the appended claims.

The invention claimed is:

1. A computer-implemented performance manager for use with a computer system, the computer system including a plurality of components each associated with a set of performance characteristics, comprising:

the computer system comprising:
- a processor; and
- a memory connected for data communication with the processor; and the performance manager comprising:
- a system model representing the state of the computer system and including a plurality of measured entities and relationships among the plurality of measured entities, the plurality of measured entities representing performance characteristics of the plurality of components;
- a plurality of data producers for providing the system model with performance information about the plurality of components;
- an interaction model for determining a set of most relevant entities affecting the computer system performance; and
- an analyzer for analyzing the performance information and detecting relationships among the plurality of measured entities, each relationship being represented as a data object in the system model and containing information about how metrics of an independent measured entity affect metrics of a dependent measured entity,
- wherein each of the plurality of measured entities corresponds to a set of metrics and controls, the controls capable of changing the performance characteristics of the components associated with each of the plurality of measured entities,
- the plurality of measured entities comprises at least one independent entity having a number of metrics and at least one dependent entity having a number of metrics,
- the system model further comprises a forward coupling strength matrix comprising a plurality of coupling strength elements arranged in a number of rows equal to the number of metrics for the independent entity and a number of columns equal to the number of metrics for the dependent entity, each coupling strength element has a value in a range from −1 to 1, a value of a coupling strength element is representative of a magnitude and a direction of a change in a first measured entity resulting from a change in a second measured entity,
- the system model further comprises a forward confidence matrix comprising a plurality of confidence elements arranged in a number of rows equal to the number of metrics for the independent entity and a number of columns equal to the number of metrics for the dependent entity, each confidence element has a value in a range from 0 to 1, a value of a confidence element is representative of a probability that a corresponding element in the forward coupling strength matrix affects a relationship between the independent entity and the dependent entity, and
- a matrix multiplication of the forward coupling strength matrix and the forward confidence matrix has a matrix result representative of the relationship between the independent entity and the dependent entity.

2. The performance manager as recited in claim 1 further comprising a visualizer for presenting the set of most relevant entities to a system operator and allowing the operator to apply changes to the component performance characteristics through the interaction model.

3. The performance manager as recited in claim 1, wherein the plurality of data producers communicate with the plurality of components in the computer system through a plurality of interface agents.

4. The performance manager as recited in claim 1 further comprising an engine between the plurality of data producers and the interaction model for exchanging data with the plurality of data producers and providing data to the system model.

5. The performance manager as recited in claim 1, wherein the system model and interaction model are maintained in a data repository.

6. The performance manager as recited in claim 5, wherein the data repository further includes an access interface to allow access to data in the repository.

7. The performance manager as recited in claim 1, wherein each relationship among the plurality of measured entities includes a plurality of dependencies each corresponding to a first metric in a first measured entity and a second metric in a second measured entity.

8. The performance manager as recited in claim 7, wherein each dependency of the plurality of dependencies is associated with a strength and a confidence, the strength indicating a degree of correlation between the respective first and second metrics, the confidence indicating a likelihood that the dependency exists.

9. The performance manager as recited in claim 1, wherein relationships are created and modified based on operator input.

10. The performance manager as recited in claim 1, wherein relationships are created and modified based on component performance information.

11. The performance manager as recited in claim 1, wherein the relationships among the measured entities are created and modified based on information provided by the plurality of data producers.

12. The performance manager as recited in claim 1, wherein the system model evaluates the plurality of measured entities based on a plurality of temperature scales and thermometers, each temperature scale denoting a context for analyzing the performance of the system, and each thermometer designating a performance measurement as compared to a threshold value.

13. A computer-program product for managing the performance of a computer system, the computer system including a plurality of components each associated with a set of performance characteristics, the computer-program product comprising:

- a computer-readable medium;
- means, provided on the computer-readable medium, for representing the state of the computer system as a system model, the system model including a plurality of measured entities and relationships among the plurality of measured entities, the plurality of measured entities representing performance characteristics of the plurality of components;
- means, provided on the computer-readable medium, for providing the system model with performance, configuration and diagnostic information about the components;
- means, provided on the computer-readable medium, for forming a forward coupling strength matrix comprising a plurality of coupling strength elements, wherein each of the plurality of coupling strength element has a value in a range from −1 to 1 and the value of a coupling strength element is representative of a magnitude and a direction of a change in a first measured entity resulting from a change in a second measured entity;

means, provided on the computer-readable medium, for forming a forward confidence matrix comprising a plurality of confidence elements, wherein each of the plurality of confidence elements has a value in a range from 0 to 1 and the value of a confidence element is representative of a probability that a corresponding element in the forward coupling strength matrix affects a relationship between a first selected measured entity and a second selected measured entity;

means, provided on the computer-readable medium, for forming a matrix representation of a relationship between two selected measured entities, wherein the matrix representation is a result of a matrix multiplication between the forward coupling strength matrix and the forward confidence matrix;

means, provided on the computer-readable medium, for determining a set of most relevant entities affecting computer system performance based on the system model;

means, provided on the computer-readable medium, for analyzing the performance information and detecting relationships among the plurality of measured entities, each relationship being represented as a data object in the system model and containing information about how metrics of an independent measured entity affect metrics of a dependent measured entity, wherein each measured entity is associated with a plurality of metrics and controls, the controls affecting; the operation of the components corresponding to each measured entity of the plurality of measured entities; and means provided on the computer-readable medium for changing the controls associated with the most relevant measured entities to improve the performance of the computer system.

14. The computer-program product as recited in claim 13 further comprising means, provided on the computer-readable medium, for presenting the set of most relevant entities to a system operator in an interaction session.

15. The computer-program product as recited in claim 13 further comprising means, provided on the computer-readable medium, for diagnosing a performance problem in the computer system using the performance manager.

16. The computer-program product as recited in claim 13 further comprising:

means, provided on the computer-readable medium, for selecting one of the measured entities as a focus entity; and means, provided on the computer-readable medium, for computing an entity priority function based on the focus entity and the entity relationship.

* * * * *